United States Patent

Soga et al.

[11] Patent Number: 5,629,965
[45] Date of Patent: May 13, 1997

[54] DIVING BELL TYPE CONTROL ROD EQUIPPED WITH SODIUM INFLOW PORT

[75] Inventors: Tomonori Soga, Ibaraki-ken; Kiyoshi Harada, Hitachi, both of Japan

[73] Assignee: Doryokuro Kakunenryo Kaihatsu Jigyodan, Tokyo, Japan

[21] Appl. No.: 647,761

[22] Filed: May 15, 1996

[30] Foreign Application Priority Data

May 16, 1995 [JP] Japan .................... 7-140065

[51] Int. Cl.$^6$ .................... G21C 7/10
[52] U.S. Cl. .................... 376/327; 376/456
[58] Field of Search .................... 376/327, 424, 376/456

[56] References Cited

U.S. PATENT DOCUMENTS

| | | | |
|---|---|---|---|
| 3,892,626 | 7/1975 | Hirose | 376/456 |
| 3,948,628 | 4/1976 | McGuire | 376/327 |
| 3,996,100 | 12/1976 | Oguma et al. | 376/456 |

FOREIGN PATENT DOCUMENTS

| | | | |
|---|---|---|---|
| 747033 | 8/1970 | Belgium | 376/327 |
| 1068589 | 4/1986 | Japan | 376/327 |
| 3071090 | 3/1991 | Japan | 376/327 |

Primary Examiner—Harvey E. Behrend
Attorney, Agent, or Firm—Wenderoth, Lind & Ponack

[57] ABSTRACT

A diving bell type control rod of sodium bond type. The control rod including a plurality of control elements each comprising a pellet chamber for packing $B_4C$ pellets and disposed in a cladding tube, an intermediate plug disposed above the pellet chamber, an upper chamber formed above the intermediate plug, a vent tube allowing the pellet chamber to communicate with the upper chamber while penetrating through the intermediate plug, upper and lower vent holes formed in upper and lower two stages in the cladding tube at the upper chamber, a sodium inflow port opening to the upper surface of the intermediate plug, and a sodium introduction tube extending from the sodium inflow port to a position below the lower end surface of the intermediate plug while penetrating through the intermediate plug.

1 Claim, 3 Drawing Sheets

DIVING BELL TYPE CONTROL ROD EQUIPPED WITH SODIUM INFLOW PORT

BACKGROUND OF THE INVENTION

This invention relates to a control rod for use in a fast reactor using a liquid sodium (Na) coolant. More particularly, the present invention relates to a diving bell type control rod equipped with a sodium inflow port for charging sodium into a control element.

Control rods of reactors generally have the construction wherein a plurality of control elements 51 are bundled as shown in FIG. 2.

The control element of the control rod for a fast reactor is constituted by loading sintered pellets of boron carbide ($B_4C$) as a neutron absorber into a cladding tube of stainless steel. $B_4C$ generates helium (He) by (n, α) reaction with neutrons. The pellet is likely to invite the mechanical interaction with the cladding tube (Absorber-Clad Mechanical Interaction: ACMI) due to swelling. How to cope with both of the increase of the internal pressure in the control element resulting from this helium gas generation and ACMI is very important.

In general, the constructions of the control rods are classified into a seal type which contains the generated helium in a helium plenum disposed inside the control element and a vent type which lets the helium escape from the control element. Further, in the vent type, the $B_4C$ pellets can be either helium or sodium bonded, and the vent type is therefore classified into a helium bond type and a sodium bond type.

The vent type is more desirable than the seal type because in the vent type the internal pressure in the control element does not increase.

A diving bell type control rod of the helium bond type shown in FIG. 3 is known as one of the vent types, and an enlargement of the vent system region thereof is shown in FIG. 4. In the control element of the control rod, a thin tube of stainless steel called a vent tube 53 is fitted to an intermediate plug 52 as shown in FIG. 3 so as to vent helium generated from pellets 54 from a vent hole 55 through the vent tube 53. The construction of the control element will be explained in further detail with reference to FIG. 4. The control element includes a pellet chamber 57 disposed inside a cladding tube 56 for loading pellets 54, an intermediate plug 52 disposed above the pellet chamber 57, an upper chamber 58 formed above the intermediate plug 52, a vent tube 53 so disposed as to penetrate through the intermediate plug 52 and to allow the pellet chamber 57 to communicate with the upper chamber 58, and a vent hole 55 so formed as to penetrate through the cladding tube 56 located at the lower portion of the upper chamber 58.

The liquid level B of sodium is determined by the balance between the external pressure applied to sodium that is to enter from outside the control element and the internal pressure of the helium gas inside the control element. The vent tube 53 is designed to have an elongated length so that sodium does not enter the pellet chamber 57 from its upper end opening. This diving bell type control rod of the helium bond type has already exhibited proven performance in fast reactors in Japan, and has attained high reliability.

On the other hand, the sodium bond type is effective against ACMI. This is because the sodium bond type can enlarge the gap between the cladding tube and the pellet due to high thermal conductivity of sodium as will be explained below. The $B_4C$ pellet reaches a high temperature due to the exothermic reaction thereof. In the case of the helium bond type described above, a thermal conductivity of helium is low. Therefore, if the gap between the pellet and the cladding tube is excessively increased, the heat radiation property of the pellet decreases and the temperature of a structural material in the vicinity of the pellet and the temperature of the pellet center rise excessively and undesirably. Contrarily, in the case of the sodium bond type, the thermal conductivity of the gap filled with sodium can be drastically improved and the heat radiation property of the pellet can be improved, as well. Accordingly, a large gap between the cladding tube and the pellet can be secured. In other words, a large initial gap can be secured in the sodium bond type and contact of the pellet with the cladding tube due to swelling of the pellet can be avoided for a long time, so that a longer service life of the control rod can be achieved.

A vertical porous plug type shown in FIG. 5 is a typical example of the conventional sodium bond type control rod. Porous plugs 73, 73 are disposed on upper and lower end plugs 71 and 72, respectively, and sodium is introduced from a lower sodium inlet 74 of the control element and is allowed to flow out from an upper sodium outlet 75. In the control rod of this type, the helium gas is escaped from the sodium outlet 75.

Because the control rod shown in FIGS. 3 and 4 is of the helium bond type, however, the initial gap cannot be secured sufficiently between the pellet and the cladding tube, and there remains the problem that ACMI occurs at a lower burnup of nuclear fuels than in the sodium bond type.

On the other hand, the vertical porous plug type control rod of the sodium bond type shown in FIG. 5 is not free from the possible problem that $B_4C$ powder produced with cracks of the pellet flows from the lower sodium inlet 74 of the control element into sodium coolant in the primary cooling system.

SUMMARY OF THE INVENTION

It is an object of the present invention to provide a diving bell type control rod equipped with a sodium inflow port which has long service life and high economical property by converting a helium bond type control rod having high reliability to that of a sodium bond type without a drastic change of the construction, and which prevents the outflow of $B_4C$ powder from a lower part of the control rod by charging sodium coolant from an upper part thereof.

According to the present invention, there is provided a diving bell type control rod having a control element including a cladding tube to be immersed longitudinally in a liquid sodium coolant, both ends of the cladding tube being provided with upper and lower end plugs; a pellet chamber disposed in the cladding tube for loading a plurality of pellets of $B_4C$; an intermediate plug disposed above the pellet chamber; an upper chamber formed above the intermediate plug; a vent tube so disposed as to penetrate through the intermediate plug and to allow the pellet chamber to communicate with the upper chamber; and a vent hole so formed as to penetrate through the cladding tube located at the upper chamber. The improvement in the control element of the present invention is characterized in that the vent hole comprises an upper vent hole and a lower vent hole formed in upper and lower two stages in such a manner as to penetrate through the cladding tube located at the upper chamber, a sodium inflow port is so formed as to open to the upper surface of the intermediate plug, and a sodium introduction tube is so disposed as to extend from the sodium inflow port to a position below the lower end surface of the vent tube while penetrating through the intermediate plug.

In the diving bell type control rod equipped with a sodium inflow port of the present invention, sodium coolant flows from the lower vent hole into the upper chamber whereas the helium gas inside the upper chamber, which has previously been sealed at the time of assembling the control element, is escaped to the outside of the control element through the upper vent hole.

Sodium in the upper chamber is then introduced into the pellet chamber through the sodium inflow port and the sodium introduction tube due to the pressure difference between the upper vent hole and the lower vent hole. The helium gas sealed at the time of assembling the control element is escaped at this time from the upper vent hole through the vent tube. Since the lower end of the sodium introduction tube is positioned below the lower end surface of the vent tube, helium generated from the $B_4C$ pellet during use does not enter the sodium introduction tube but is discharged through the vent tube and the upper vent hole.

PREFERRED EMBODIMENTS OF THE INVENTION

An embodiment of the present invention will be explained hereinbelow with reference to FIG. 1.

Figure 1:
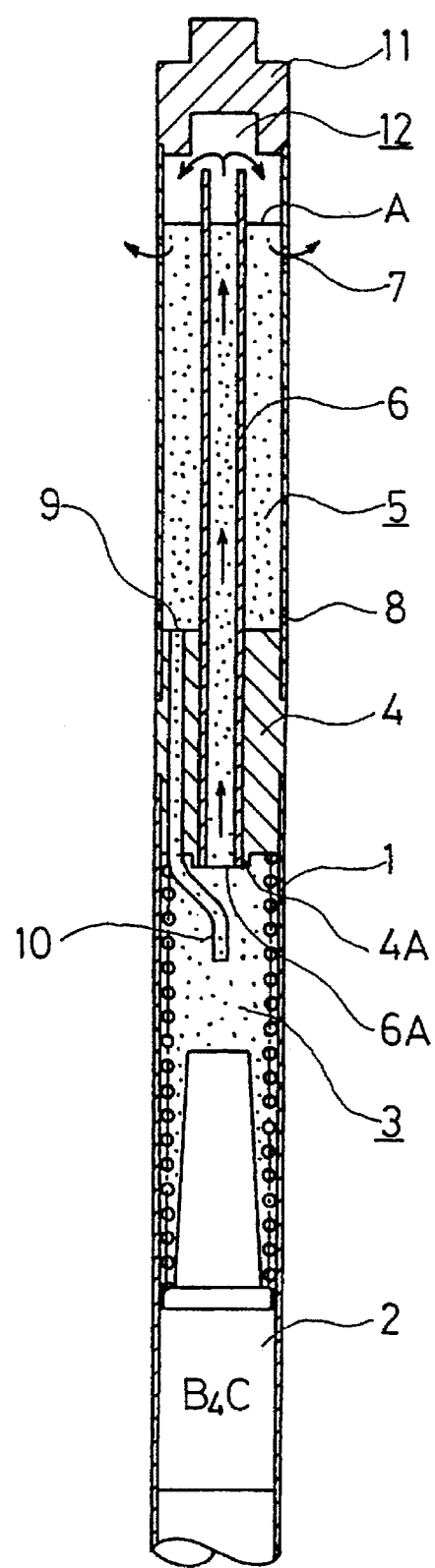
FIG. 1 is an enlarged longitudinal sectional view showing the principal portions of a control element of a diving bell type control rod equipped with a sodium inflow port according to one embodiment of the present invention.
Figure 2:
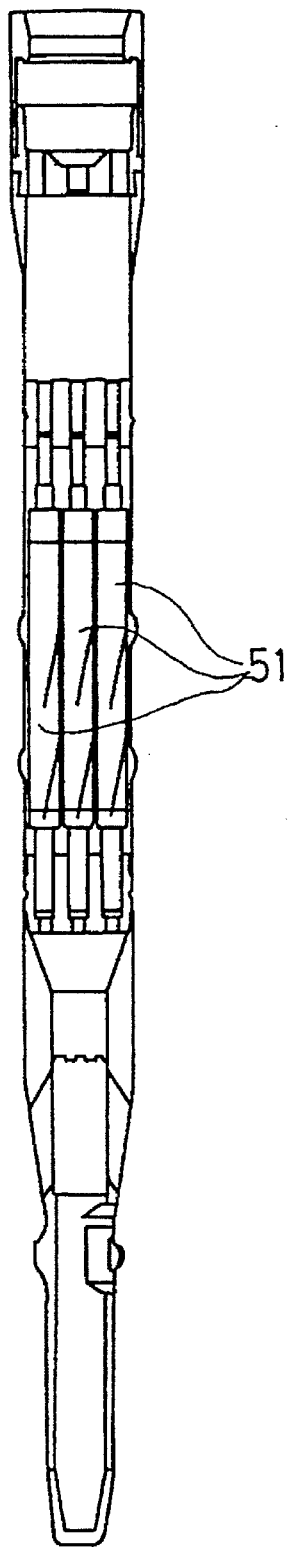
FIG. 2 is a front view showing a general example of a control rod comprising a bundle of a plurality of control elements.
Figure 3:
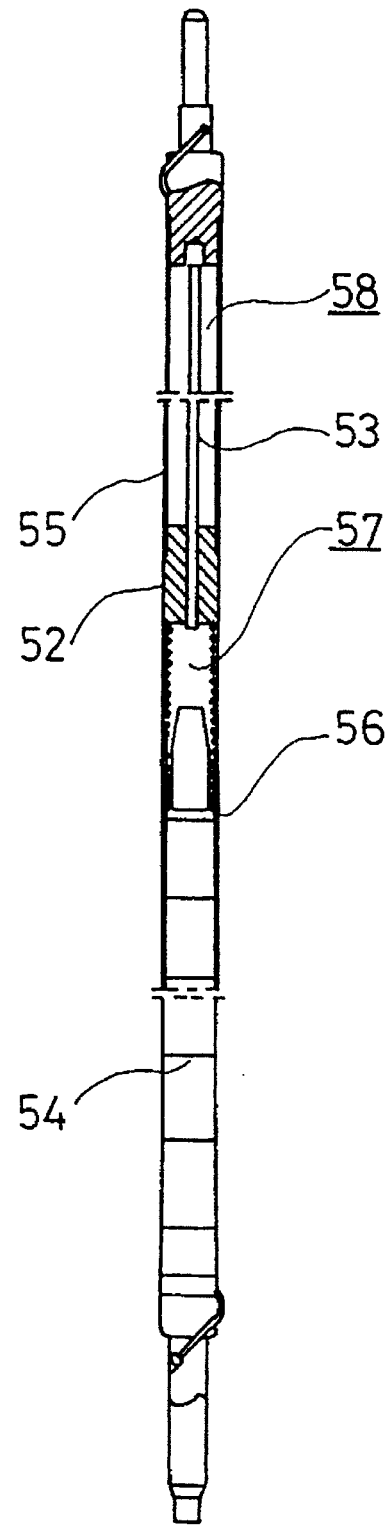
FIG. 3 is a longitudinal sectional view showing the overall appearance of a control element of a diving bell type control rod of the helium bond type according to a prior art example.

FIG. 1 shows a control element included in a diving bell type control rod equipped with a sodium inflow port according to one embodiment of the present invention. This control element comprises a cladding tube 1 immersed in a sodium coolant, a pellet chamber 3 for loading pellets 2 of $B_4C$ formed inside the cladding tube 1, an intermediate plug 4 disposed above the pellet chamber 3, an upper chamber 5 formed above the intermediate plug 4, a vent tube 6 so disposed as to allow the pellet chamber 2 to communicate with the upper chamber 5 while penetrating through the intermediate plug 4, an upper vent hole 7 and a lower vent hole 8 formed in upper and lower two stages in such a manner as to penetrate through the cladding tube 1 located at the upper chamber 5, a sodium inflow port 9 so formed as to open to the upper surface of the intermediate plug 4, and a sodium introduction tube 10 so formed as to extend from the sodium inflow port 9 to the inside of the pellet chamber 3 while penetrating through the intermediate plug 4.

The control element as shown in FIG. 1 is disposed and immersed in sodium coolant in the primary cooling system of a fast reactor in a longitudinal direction as shown in the drawing.

The construction of this control element is similar to that of the conventional diving bell type control rod of the helium bond type in that the pellet chamber, the intermediate plug, the upper chamber, the vent tube and the vent hole are provided. However, the control element of the present invention is constituted by adding the upper vent hole 7 and the lower vent hole 8 formed in upper and lower two stages as the vent hole, the sodium inflow port 9 opening to the upper surface of the intermediate plug 4 and the sodium introduction tube 10 extending from the sodium inflow port 9 into the pellet chamber 3 while penetrating through the intermediate plug 4. The control element is shaped into the sodium bond type by merely adding such simple components. Since the control element is constituted into the sodium bond type, the gap between the cladding tube 1 and the pellet 2 can be enlarged, so that ACMI can be avoided for a long time and service life of the control rod can be improved.

The reason why the vent holes 7 and 8 are disposed in the upper and lower two stages is that the helium gas is allowed to escape to the outside from the upper vent hole 7 while sodium can flow in from the lower vent hole 8. If the vent hole is disposed in only one of the upper and lower stages, the internal pressure due to the helium gas restricts the inflow of sodium into the pellet chamber 3.

The sodium inflow port 9 and the sodium introduction tube 10 are disposed so as to let sodium inside the upper chamber 5 flow down into the pellet chamber 3.

The sodium introduction tube 10 is formed so that the lower end thereof extends downward from the lower end surface 6A of the vent tube 6. This is because the helium gas generated from the pellet 2 during use can be introduced into the vent tube 6 from the lower end surface 4A of the intermediate plug 4 but is prevented from entering the sodium introduction tube 10.

In short, the sodium charging route comprises sodium outside the control element→lower vent hole 8→upper chamber 5→sodium inflow port 9→sodium introduction tube 10→pellet chamber 3→vent tube 6. On the other hand, the helium discharging route during use comprises the pellet chamber 3→vent tube 6→upper chamber 5→helium space 12→upper vent hole 7→sodium outside the control element (indicated by arrow in FIG. 1). In this way, the sodium charging route and the helium discharging route are mutually independent in the control rod of the present invention. Accordingly, in comparison with the case where charging of sodium and discharging of helium are effected by one route, the present invention can make the $B_4C$ powder dispersed in sodium inside the control element remain in the control element and can prevent its outflow outside the control element.

Further, because the sodium charging route is formed so that sodium flows from the upper portion to the inside and because there is no opening at the lower part of the control element, the outflow of the $B_4C$ powder outside the control element can be prevented.

Figure 4:
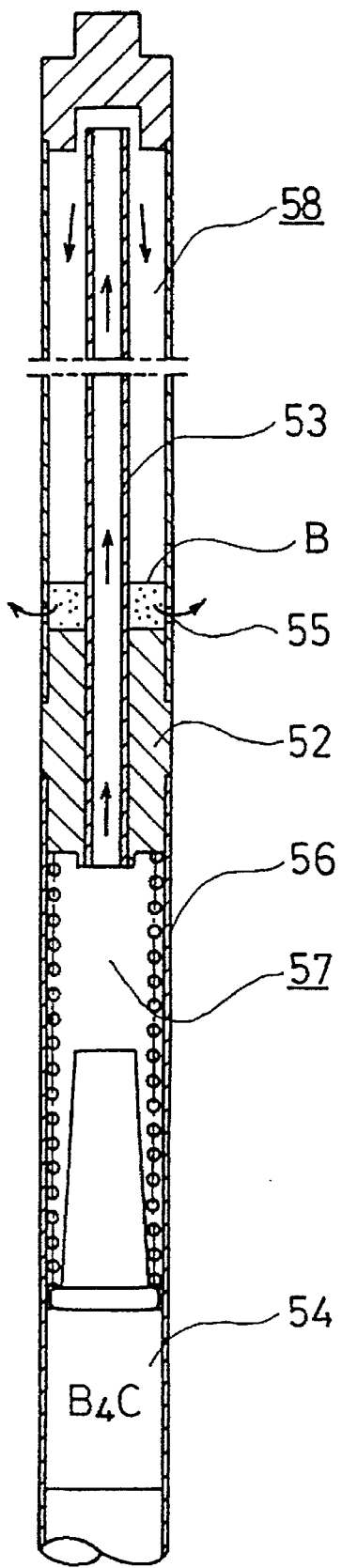
FIG. 4 is a longitudinal sectional view showing in enlargement a part of the control element shown in FIG. 3.
Figure 5:
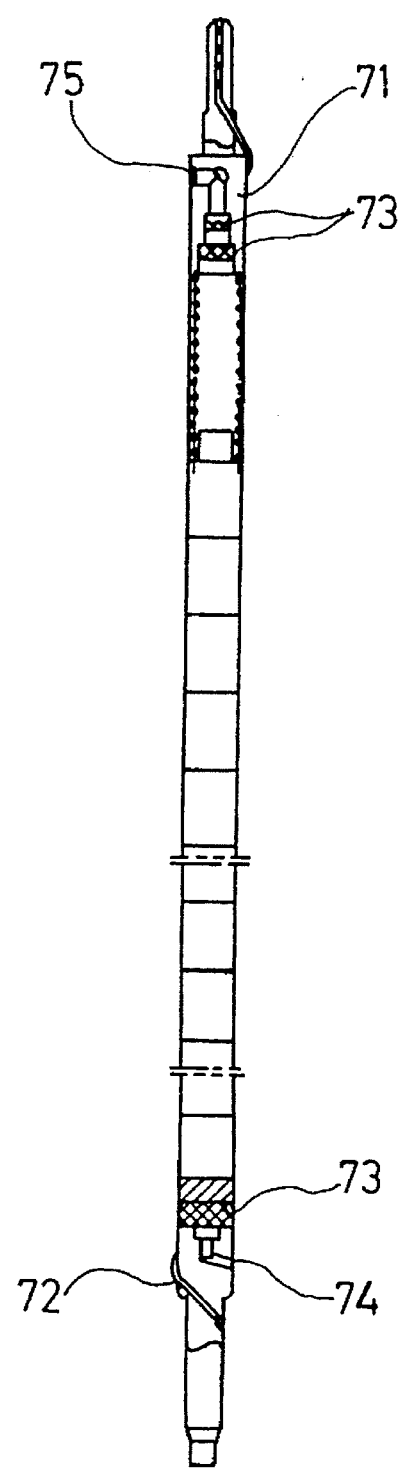
FIG. 5 is a longitudinal sectional view of a control element of a porous plug upper and lower double vent type control rod of the sodium bond type according to another prior art example.

Since the present invention has the sodium charging function, it can drastically reduce the length of the vent tube 6 in comparison with the diving bell type control rod of the helium bond type which prevents intrusion of sodium into the pellet chamber by the elongated vent tube (compare the length of vent tube 6 shown In FIG. 1 with that of the vent tube 53 shown in FIG. 4).

Reference numeral 11 denotes an upper end plug and reference numeral 12 denotes a helium space. The lower end of the control element is provided with a lower end plug (not shown). The control rod is produced by bundling a plurality of control elements shown in FIG. 1.

In the diving bell type control rod equipped with the sodium inflow port and including the control elements having the construction described above, sodium is charged and helium is discharged in the following way.

During assembling of the control element, the upper and lower vent holes 7 and 8 are sealed by a solder seal (not shown) and helium is enclosed in the control element. When this control element is immersed in sodium coolant of the fast reactor, the solder seal is molten by the heat of sodium, so that sodium coolant flows into the upper chamber 5 from the lower vent hole 8 while the helium gas in the upper chamber 5 previously enclosed during assembling is emitted from the upper vent hole 7 outside the control element. Thus sodium flows into the upper chamber 5.

Next, sodium flows down into the pellet chamber 3 from the sodium inflow port 9 through the sodium introduction tube 10 due to the pressure difference between the upper vent hole 7 and the lower vent hole 8.

Sodium in the pellet chamber 3 then rises inside the vent tube 6 up to the liquid level in the upper chamber 5 outside the vent tube 6. Sodium in the upper chamber 5 and the vent tube 6 attains a free liquid level of the level A.

As sodium flows in this way, the major proportion of helium enclosed in the cladding tube 1 at the time of assembling is discharged outside the control element through the route comprising the pellet chamber 3→vent tube 6→helium space 12→upper vent hole 7.

As described above, the inside of the control element, that is, the upper chamber 5, the pellet chamber 3, the vent tube 6 and the gap between the pellet 2 and the cladding tube 1, are filled with sodium.

The helium gas generated from the $B_4C$ pellet 2 during use enters the vent tube 6 from the lower end surface 4A of the intermediate plug 4 and is further discharged from the upper vent hole 7 outside the control element. Because the lower end of the sodium introduction tube 10 extends below the lower end surface 6A of the vent tube 6, the helium gas hardly enters the sodium introduction tube 10.

As being understood from the foregoing, in the diving bell type control rod equipped with the sodium inflow port of the present invention, sodium flows into the upper chamber from the lower vent hole, and sodium inside the upper chamber flows down into the pellet chamber through the sodium inflow port and the sodium introduction tube, and rises in the vent tube. In this way, the pellet chamber is filled with sodium. During this charging of sodium, the helium gas enclosed in the cladding tube is discharged outside from the upper vent hole through the vent tube. The helium gas generated from the $B_4C$ pellet during use does not enter the sodium introduction tube because the sodium introduction tube extends below the lower end surface of the vent tube, but is discharged outside through the vent tube and the upper vent hole.

Accordingly, the control element of the present invention provides the following effects.

Since the control element is provided with the sodium charging function and attains the sodium bond type, it can retard the time of generating ACMI and can drastically prolong service life. Moreover, because the present invention can provide the diving bell type control rod of the helium bond type, which has attained proven performance and has had high reliability in safety in the past, with the sodium charging function without a drastic change of the construction, the present invention can produce the control element having high reliability at a low production cost.

When the control rod is loaded into the reactor, sodium is allowed to flow and is charged from the lower vent hole disposed at the upper part of the control element. Therefore, the outflow of the boron carbide powder from the lower part of the control element into the cooling system can be prevented. Sodium is charged through the sodium introduction tube while helium is discharged through the vent tube so that the sodium charging route and the helium discharging route are mutually independent. Therefore, the boron carbide powder dispersed into sodium in the control element can be retained inside the control element.

In the conventional diving bell type control rod of the helium bond type, further, intrusion of sodium into the pellet chamber is prevented by increasing the length of the vent tube whereas in the present invention, the control element is provided with the sodium charging function. Therefore, the length of the vent tube can be drastically reduced, and the overall length of the control rod can be reduced.

What is claimed is:

1. A diving bell type control rod having a control element including
    a cladding tube to be immersed longitudinally in a liquid sodium coolant, both ends of said cladding tube being provided with upper and lower end plugs;
    a pellet chamber disposed in said cladding tube for loading a plurality of pellets of boron carbide;
    an intermediate plug disposed above said pellet chamber;
    an upper chamber formed above said intermediate plug;
    a vent tube so disposed as to penetrate through said intermediate plug and to allow said pellet chamber to communicate with said upper chamber; and
    a vent hole so formed as to penetrate through said cladding tube located at said upper chamber; characterized in that
    said vent hole comprises an upper vent hole and a lower vent hole formed in upper and lower two stages in such a manner as to penetrate through said cladding tube located at said upper chamber,
    a sodium inflow port is so formed as to open to the upper surface of said intermediate plug, and
    a sodium introduction tube is so disposed as to extend from said sodium inflow port to a position below the lower end surface of said vent tube while penetrating through said intermediate plug.

* * * * *

UNITED STATES PATENT AND TRADEMARK OFFICE
CERTIFICATE OF CORRECTION

PATENT NO. : 5,629,965
DATED : May 13, 1997
INVENTOR(S) : Tomonori SOGA et al.

It is certified that error appears in the above-identified patent and that said Letters Patent is hereby corrected as shown below:

On the Abstract page, amend the Abstract as follows:

Line 1, delete ". The";

Line 2, change "control rod including" to --includes--;

Line 3, change "comprising" to --having--;

Line 6, after "plug," insert --and--;

Line 8, change "plug, upper" to --plug. Upper--;

Line 9, after "holes" insert --are--;

Line 10, change "chamber, a" to --chamber. A-- and change "opening" to --opens--;

Line 12, change "extending" to --extends--.

Column 1, line 18, delete "the";

line 45, delete "an";

line 47, delete "a"

UNITED STATES PATENT AND TRADEMARK OFFICE
CERTIFICATE OF CORRECTION

PATENT NO. : 5,629,965
DATED : May 13, 1997
INVENTOR(S) : Tomonori SOGA et al.

It is certified that error appears in the above-identified patent and that said Letters Patent is hereby corrected as shown below:

Column 1, line 50, delete "a";

line 54, after "to" (first occurrence) insert --the--.

Column 2, line 2, delete "a";

line 19, delete ", 73";

line 23, change "is escaped" to --escapes--;

line 40, after "has" insert --a-- and change "high economical property" to --is highly economical--;

line 42, delete "that of".

Column 3, line 5, delete "is";

line 6, change "escaped" to --escapes--;

line 13, change "is escaped" to --escapes--;

UNITED STATES PATENT AND TRADEMARK OFFICE
CERTIFICATE OF CORRECTION

PATENT NO. :  5,629,965

DATED      :  May 13, 1997

INVENTOR(S) :  Tomonori SOGA et al.

It is certified that error appears in the above-identified patent and that said Letters Patent is hereby corrected as shown below:

Column 3, line 31, change "in" to --on--;

line 32, change "enlargement" to --enlarged scale--.

Column 4, line 41, change "arrow" to --arrows--;

line 63, change "a" to --the--.

Column 5, line 9, change "molten" to --melted-- and after "of" insert --the--;

line 12, change "assembling" to --assembly--;

line 22, delete "the"; (third occurrences)

line 25, change "assembling" to --assembly--;

line 39, change "being" to --is--.

UNITED STATES PATENT AND TRADEMARK OFFICE
CERTIFICATE OF CORRECTION

PATENT NO. : 5,629,965
DATED : May 13, 1997
INVENTOR(S) : Tomonori SOGA et al.

It is certified that error appears in the above-identified patent and that said Letters Patent is hereby corrected as shown below:

Column 6, Claim 1, line 2, after "including" insert --:--;

line 12, delete "and";

line 14, change "chamber; charac-" to --chamber, said vent hole comprising an upper vent hole and a lower--;

line 15, delete entirely;

line 16, delete entirely;

line 19, change "," to --;--;

line 20, delete "is so"; delete "as"; and, change "the" to --an--;

line 21, change "," to --;--;

line 22, delete "is so" and delete "as";

UNITED STATES PATENT AND TRADEMARK OFFICE
CERTIFICATE OF CORRECTION

PATENT NO. : 5,629,965
DATED : May 13, 1997
INVENTOR(S) : Tomonori SOGA et al.

It is certified that error appears in the above-identified patent and that said Letters Patent is hereby corrected as shown below:

Column 6, line 23, change "the" to -- a --.

Signed and Sealed this

Thirty-first Day of March, 1998

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO.   : 5,629,965
DATED        : May 13, 1997
INVENTOR(S)  : Tomonori SOGA et al.

It is certified that error appears in the above-identified patent and that said Letters Patent is hereby corrected as shown below:

On the title page, the assignee information should be listed as:

--[73]  Doryokuro Kakunenryo Kaihatsu Jigyodan
         and Hitachi, Ltd., both of Tokyo, Japan--.

Signed and Sealed this

Sixteenth Day of March, 1999

Attest:

Attesting Officer

Q. TODD DICKINSON

Acting Commissioner of Patents and Trademarks